(12) United States Patent
Swierczewski (10) Patent No.: US 6,257,663 B1
(45) Date of Patent: Jul. 10, 2001

(54) VEHICLE SEAT FOR ABSORBING IMPACT

(76) Inventor: Richard Swierczewski, 59 Oak Glen Rd., Toms River, NJ (US) 08753

( * ) Notice: Subject to any disclaimer, the term of this patent is extended or adjusted under 35 U.S.C. 154(b) by 0 days.

(21) Appl. No.: 09/557,973

(22) Filed: Apr. 25, 2000

Related U.S. Application Data (60) Provisional application No. 60/131,222, filed on Apr. 27, 1999.

(51) Int. Cl.$^7$ ........................................................ B60N 2/42
(52) U.S. Cl. ................................. 297/216.19; 297/216.16
(58) Field of Search ............................. 297/216.1, 216.16, 297/216.19, 216.2, 325, 326

(56) References Cited

U.S. PATENT DOCUMENTS

| | | |
|---|---|---|
| Re. 35,572 | 7/1997 | Lloyd et al. . |
| 2,227,717 | * 1/1941 | Jones . |
| 3,081,059 | * 3/1963 | Hastings et al. . |
| 4,275,914 | 6/1981 | Holweg et al. . |
| 5,292,179 | 3/1994 | Forget . |
| 5,328,234 | 7/1994 | Daniel et al. . |
| 5,344,204 | 9/1994 | Liu . |
| 5,605,372 | 2/1997 | Al-Abdullateef . |
| 5,743,591 | 4/1998 | Tame . |
| 5,829,827 | 11/1998 | Schaper et al. . |

FOREIGN PATENT DOCUMENTS

| | | |
|---|---|---|
| 2112443 | 9/1971 | (DE) . |
| 2060951 | 6/1972 | (DE) . |
| 2087226 A | 5/1982 | (GB) . |
| 57-138432 | 8/1982 | (JP) . |

* cited by examiner

Primary Examiner—Milton Nelson, Jr.
(74) Attorney, Agent, or Firm—Richard C. Litman (57) ABSTRACT

A vehicle seat apparatus for absorbing different types of forces, shocks, and vibrations commonly encountered in different types of vehicle accidents and sudden hard braking of a vehicle. The vehicle seat apparatus includes a seat cushion, a seat back cushion, a bottom support structure, a top plate, a ball bearing housing containing a plurality of ball bearings, a plurality of shock absorbers, a plurality of linkage rods, and a pulley system. The top plate is adapted for sliding over the ball bearings in a lateral, forward, and/or rearward direction in response to a vehicle accident or to a sudden hard braking of the vehicle. The vehicle seat apparatus may further include at least one seat restraint and at least two lateral side air bags.

12 Claims, 7 Drawing Sheets

VEHICLE SEAT FOR ABSORBING IMPACT

CROSS-REFERENCE TO RELATED APPLICATION

This application claims the benefit of U.S. Provisional Patent Application Ser. No. 60/131,222, filed Apr. 27, 1999.

BACKGROUND OF THE INVENTION

1. Field of the Invention

The present invention relates generally to impact absorbing vehicle seats. More specifically, the invention is a vehicle seat apparatus for absorbing different types of forces, shocks, and vibrations commonly encountered in vehicle accidents and sudden hard braking of a vehicle.

2. Description of Related Art

A number of practices and apparatuses have been devised for absorbing different types of forces, shocks, and vibrations commonly encountered in different types of vehicle accidents and sudden hard braking of a vehicle.

For example, U.S. Pat. No. Re. 35,572 issued on Jul. 29, 1997 to Lloyd et al. discloses a seat assembly for a motor vehicle that includes an air suspension system for isolating the occupant of the seat from shock, vibration, and inertial forces directed along both vertical and horizontal axes. A base plate is mounted to the floor of the vehicle and supports first and second pairs of sleeve bearings on opposed sides of a box-like housing. The housing is attached to a pair of guide rods which cooperate with the sleeve bearings to provide fore and aft movement of the housing. Springs operating in cooperation with a first horizontally disposed air bag serves to dampen out inertial forces on the vehicle seat. The seat itself is supported atop a vertically oriented air spring and a plurality of hydraulic vibration dampeners that tend to cushion vertically directed forces acting upon the seat and its occupant.

U.S. Pat. No. 4,275,914, issued on Jun. 30, 1981 to Holweg et al., discloses an arresting device in a longitudinally adjustable guide rail assembly for motor vehicle seats. The device includes a shaft rotatably supported in a stationary bearing plate and driven by a stationary electromotor. The driving pinion of the electromotor is in mesh with an intermediate gear which is supported for free rotation on the shaft. A coupling disk is supported for joint rotation on the shaft and for an axial displacement between the bearing plate and the face of an intermediate gear.

U.S. Pat. No. 5,292,179, issued on Mar. 8, 1994 to Forget, discloses a fixed plate supporting a vehicle seat that is secured to longitudinal adjusting slides. The fixed plate supports a rotary intermediate plate via a first ball bearing and a cover rigidly connected to the fixed plate and supported at the rotary intermediate plate via a second ball bearing. The assembly is centered on the two ball bearings.

U.S. Pat. No. 5,328,234, issued on Jul. 12, 1994 to Daniel et al., discloses a rotatable seat that includes a horizontal seat portion, an upright back portion, and a structure for rotating the seat portion and/or back portion in reaction to an impact from the side of the vehicle to place the rotatable seat between the occupant and the intruding side of the vehicle.

U.S. Pat. No. 5,344,204, issued on Sep. 6, 1994 to Liu, discloses a safe driver seat unit that includes a seat supported on two rails by four ball bearings mounted in the seat legs, and a arrangement wherein an electromagnetic controller locks the seat in a normal position. In a collision, sensors will turn on power to unlock the seat so that springs may move the seat backwardly.

U.S. Pat. No. 5,605,372, issued on Feb. 25, 1997 to Al-Abdullateef, discloses an automotive safety seat that reduces g-loads imparted to an occupant during a collision by absorbing some of the energy of impact. Kinetic energy is converted to potential energy with the elevation of the seat and its occupant and the compression of springs.

U.S. Pat. No. 5,743,591, issued on Apr. 28, 1998 to Tame, discloses a vehicle seat which includes a seat cushion assembly and a hydraulic actuator. A first mounting assembly is constructed and arranged to mount the seat cushion assembly on a vehicle floor, and a second mounting assembly is provided which is constructed and arranged to mount a seat back cushion assembly on the seat cushion assembly.

U.S. Pat. No. 5,829,827, issued on Nov. 3, 1998 to Schaper et al., discloses a passenger seat that has a seat member and a backrest. A first side air bag is integrated into the seat member and the back rest for lateral impact protection in an accident.

German Patent No. 2,112,443, published Sep. 23, 1971, discloses a vehicle passenger safety system which has the seat belt anchorages and/or the seating rear anchorage points attached through energy absorbing components so that each passenger describes a predetermined path within the compartment with an increasing braking force until suitable padding brings the passenger to a safe stop.

German Patent No. 2,060,951, published Jun. 22, 1972, discloses a car seat that is mounted on a spring loaded support to absorb impact forces. The support is braced by either mechanical springs or hydraulic shock absorbers, and converts impact forces into a smooth recoil to protect the occupants in the event of a collision.

Great Britain Patent No. 2,087,226A, published May 26, 1982, discloses a shock absorbing seat that is formed by two connected portions. The shorter rear portion is a flat metal sheet bent upwardly at the back and riveted to the rear cross-member of a tubular support frame. The front portion includes a metal sheet which is "waisted" in plan view and curved upwardly from the rear in side elevation to a smoothly curved peak from which it is bent downwardly as a flat vertical panel. The panel is riveted along its lower edge to the front cross-member of the support frame.

Japan Patent No. 57-138432, published Aug. 26, 1982, discloses a seat in a vehicle for construction machinery. A pair of springs are provided across a portal strut and vertical plate, and a shock absorber is pivotally connected to a horizontally supported frame and the strut.

The prior art fails to teach a practice or an apparatus which is flexible in movement and effective for absorbing different types of forces, shocks, and vibrations commonly encountered in different types of vehicle accidents and sudden hard braking of a vehicle. None of the above inventions and patents, taken either singly or in combination, is seen to describe the instant invention as claimed.

SUMMARY OF THE INVENTION

A vehicle seat apparatus for absorbing different types of forces, shocks, and vibrations commonly encountered in different types of vehicle accidents and sudden hard braking of a vehicle. In the preferred embodiment, the vehicle seat apparatus includes a seat cushion, a seat back cushion, a bottom support structure, a ball bearing housing, a top plate, a plurality of shock absorbers, a means for linking the shock absorbers to the ball bearing housing, and a means for restoring the top plate to the original position of the top plate along the longitudinal axis of a vehicle relative to the ball bearing housing.

The seat cushion has a bottom and an internal frame, while the seat back cushion has a front, a back, and an internal frame.

The bottom support structure has a plurality of sides, an apex defined by the sides of the support structure, and a bulbous or ball-like structure at the apex. The sides of the support structure has a plurality of channels, and the support structure is attached to the bottom internal frame of the seat cushion.

The ball bearing housing includes a frame, a plurality of ball bearings contained within the frame of the housing, and a plurality of sockets. The housing is mounted to a vehicle floor.

The top plate has an upper surface, a lower surface, a plurality of channels, and a socket located at the upper surface. The lower surface is, preferably, smooth so as to permit the top plate to slide smoothly over the ball bearings in a lateral, forward, and/or rearward direction in response to a vehicle accident or to a sudden hard braking of the vehicle. The socket of the top plate is dimensioned and configured for receiving the bulbous structure of the support structure and for permitting the bulbous structure of the support structure to have universal movement.

There are a plurality of shock absorbers wherein each shock absorber is a combination of a damper and of a biasing means. The damper has an upper end, a lower end, and an elongated body portion. The upper end of the damper is adapted for attaching with the bottom of the seat cushion. The biasing means is a coil spring or air spring, and has an upper end and a lower end wherein each end of the spring is adapted for fixedly attaching with a corresponding end of the damper. The spring is dimensioned and configured to wrap around the body portion of the damper, and has an equilibrium position when the seat apparatus is in an upright position.

The means for linking the shock absorbers to the ball bearing housing are a plurality of linkage rods. Each linkage rod has an upper end, a lower end, and a body portion. Each end of each linkage rod is a ball-like or bulbous structure, and is adapted for universal movement. Each upper end of the linkage rods attaches to and engages with the lower end of a corresponding damper, while each lower end of the linkage rods attaches to and engages with a corresponding socket of the housing.

The means for restoring the top plate to the original position of the top plate along the longitudinal axis of a vehicle relative to the ball bearing housing is a pulley system. The pulley system includes a plurality of pulleys and pulley cables which are effective to allow an occupant of the vehicle to use his/her gravitational momentum against the forces generated by vehicle impact or by a hard braking. The pulleys are fixedly attached to the vehicle floor. Each corresponding cable has a first end and a second end wherein the first end of the cable is attached to the bottom of the seat cushion and the second end of the cable is attached to a roller incorporated to the upper end of the seat back cushion frame. The seat apparatus may further include at least two seat restraint and at least two lateral side air bags. Each side air bag is preferably attached to a corresponding seat belt.

A second embodiment of the invention comprises a top plate which incorporates an array of coiled or air springs and ball bearings arranged so that the seat will have omni-directional movement upon vehicle impact or a hard braking. The second embodiment also includes a variety of ways whereby the support structure may engage the base plate.

Accordingly, it is a principal object of the invention to provide a vehicle seat apparatus which protects an occupant from different types of forces, shocks, and vibrations commonly encountered in vehicle accidents.

It is another object of the invention to provide a vehicle seat apparatus for absorbing different types of forces, shocks, and vibrations commonly encountered in sudden hard braking of a vehicle.

It is a further object of the invention to provide a vehicle seat apparatus which is flexible in movement and effective or absorbing different types of forces, shocks, and vibrations commonly encountered in vehicle accidents and sudden hard braking of a vehicle.

It is an object of the invention to provide improved elements and arrangements thereof in an apparatus for the purposes described which are dependable, flexible in movement, and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF TIE PREFERRED EMBODIMENTS

Figure 1:
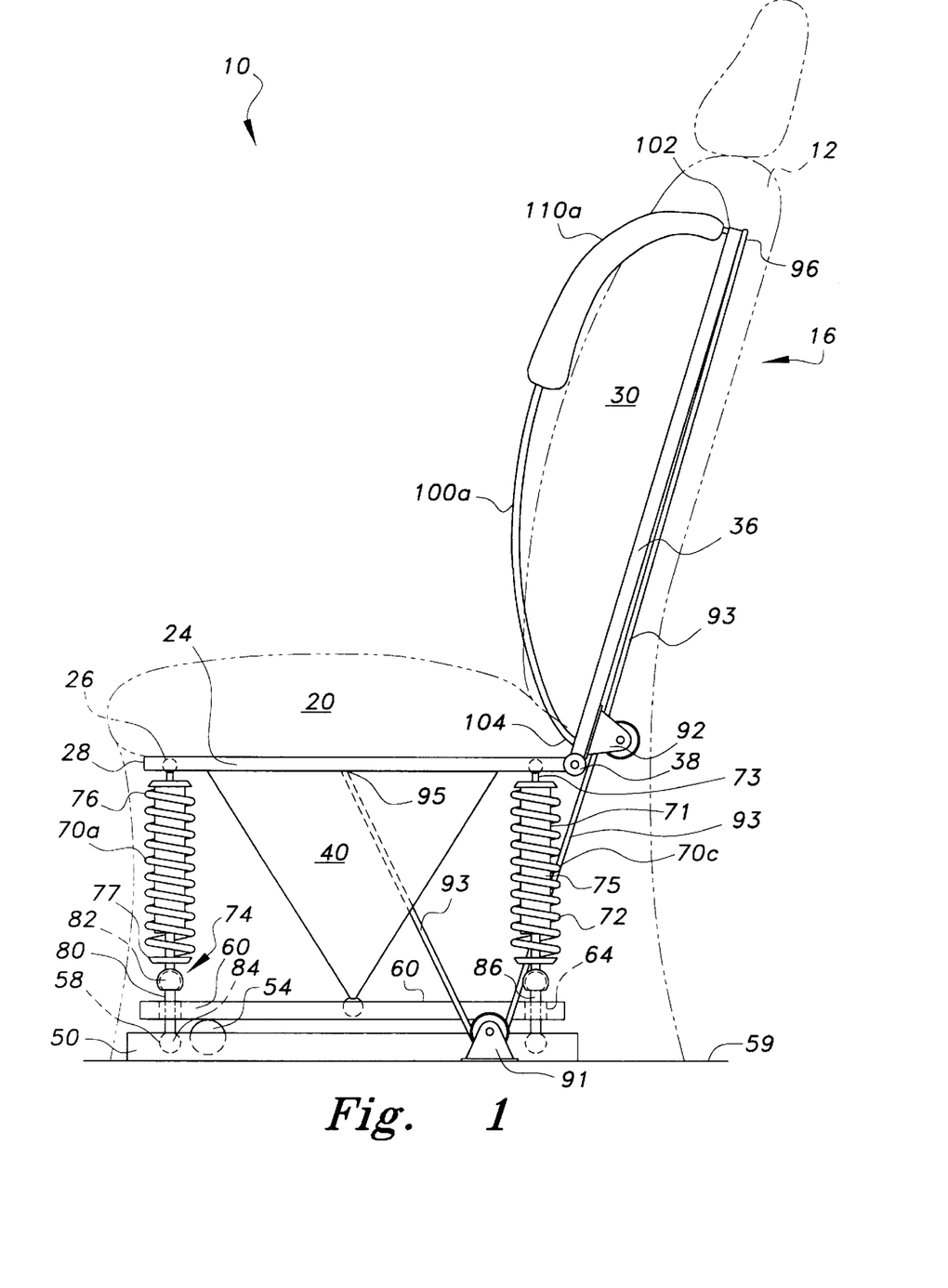
FIG. 1 is a side view of an impact absorbing vehicle seat apparatus, in an upright position, according to the preferred embodiment of the present invention.
Figure 2:
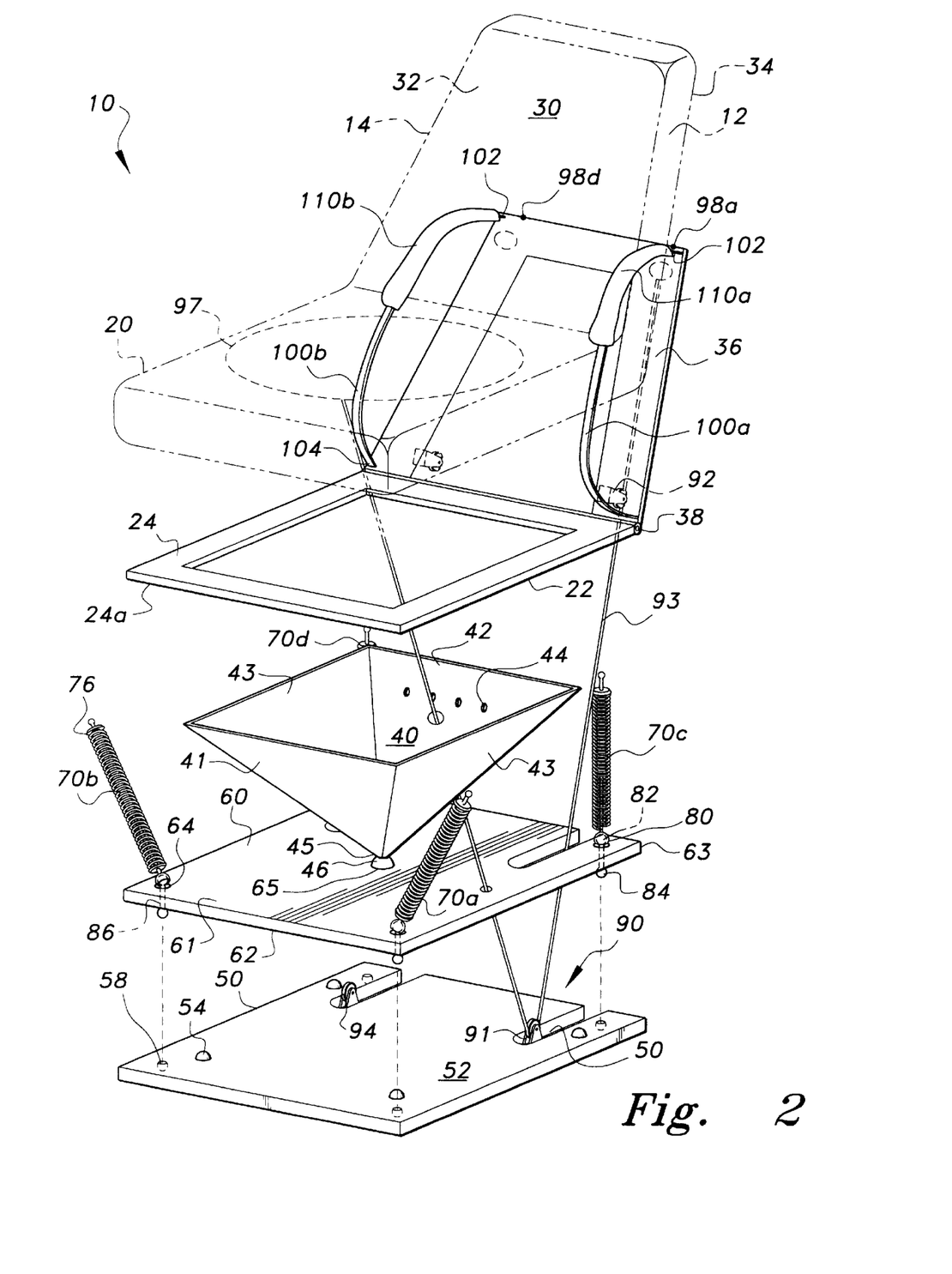
FIG. 2 is an exploded, perspective view of an impact absorbing vehicle seat apparatus according to the preferred embodiment of the present invention.
Figure 3:
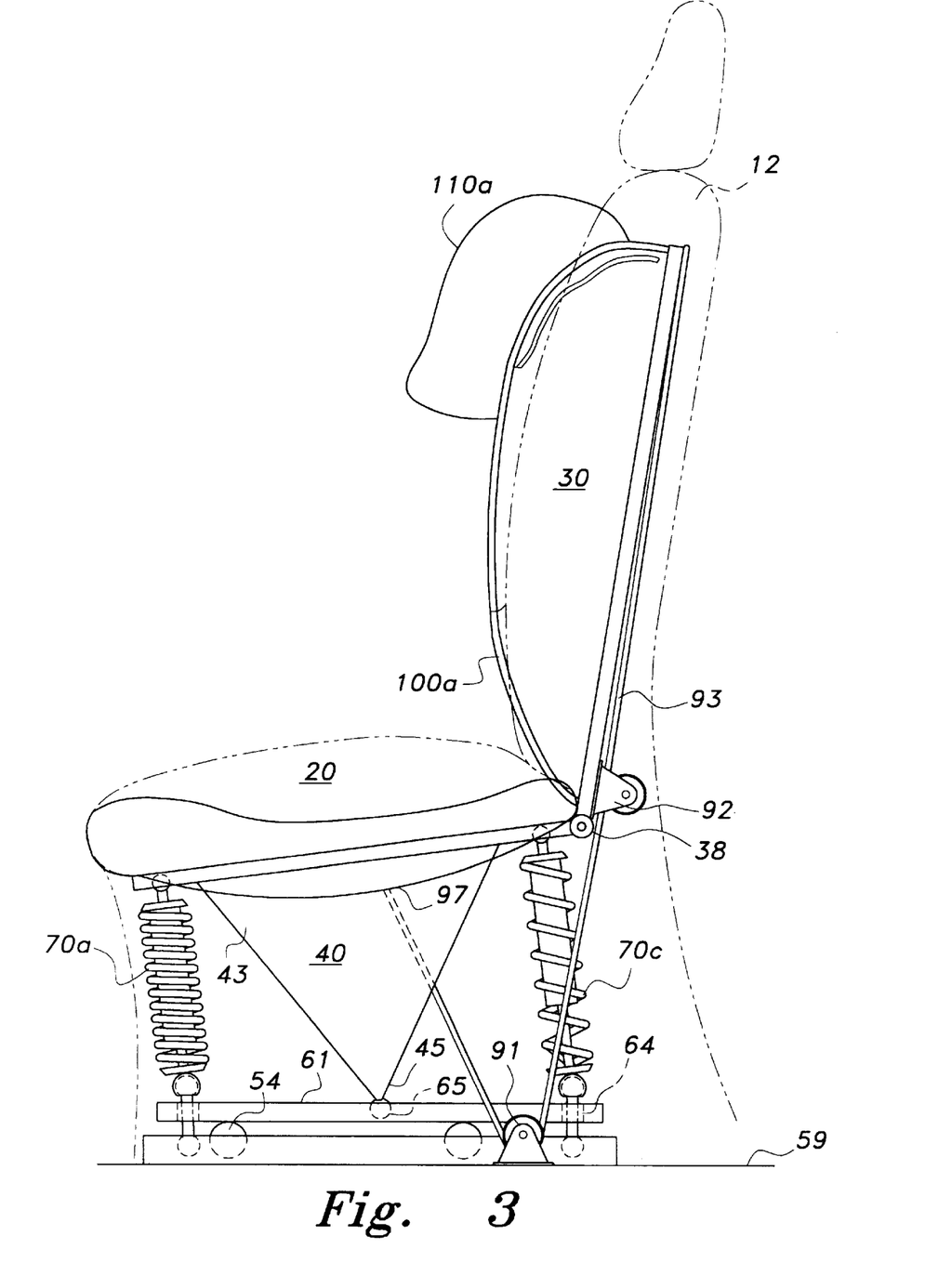
FIG. 3 is a side view of an impact absorbing vehicle seat apparatus in a response position according to the preferred embodiment of the present invention.

Referring to FIGS. 1–3, the present invention is directed to a vehicle seat apparatus 10 for absorbing different types of forces, shocks, and vibrations commonly encountered during accidents and sudden hard braking of the vehicle. The vehicle seat apparatus 10 has a first lateral side 12, a second lateral side 14, and an original position (as shown in FIG. 1) when the seat apparatus 10 is properly aligned and in an upright position 16. As best shown in FIG. 2, the vehicle seat apparatus 10 includes a seat cushion 20, a seat back cushion 30, a bottom support structure 40, a ball bearing housing 50, a top plate 60 having an original position, four shock absorbers 70a, 70b, 70c, 70d, a means 80 for linking the shock absorbers 70a, 70b, 70c, 70d to the ball bearing housing 50, and a means 90 for restoring the top plate 60 to the original position of the top plate 60 along a longitudinal axis of a vehicle relative to the ball bearing housing 50.

As best shown in FIG. 2, the seat cushion 20 has a bottom frame support 22 which has rectangular, planar, top and bottom surfaces 24, 24a. Bottom 22 is essentially coextensive with the perimeter of cushion 20. A socket 26 is disposed in the bottom surface 24a adjacent each of the four corners 28 of bottom 22.

The seat back cushion 30 (FIG. 2) has a front 32, a back 34, and an internal frame 36. Cushion 30 is dimensioned and configured for supporting the back of an occupant seated on the seat cushion 20. The cushions 20, 30 are pivotally coupled to each other at a pivot 38. As well known in the art, the seat back cushion 30 may move about the pivot 38 to a reclined position (not shown) and may also be folded forwardly for easy entry into a rear passenger compartment of the vehicle (not shown).

A bottom support structure 40 has a front side 41, a rear side 42, and two lateral sides 43. It is preferred that the rear side 42 has at least four channels 44 that are in the positions shown in FIG. 2. The support structure 40 is configured as a pyramid having an apex 45. A ball-like structure 46 is affixed to the apex 45. The support structure 40 is, preferably, hollow, and is attached to the bottom 22 of the seat cushion 20 by any well known and convenient means in the art (welding, bolting, etc.).

As best shown in FIG. 2, the top plate 60 is of rectangular configuration and has upper and lower planar surfaces 61, 62. A channel 64 is disposed adjacent each corner of top plate 60. A socket 65 is located at the center of the upper surface 61. The lower surface 62 is fabricated of smooth low-friction material for reasons explained below. The socket 65 of the top plate 60 is dimensioned and configured to receive the ball-like structure 46 of the bottom support structure 40 so as to form a ball and socket joint. The formation of the aforestated joint will permit the assembled seat apparatus to tilt in a lateral, forward, or rearward direction in response to an accident or a sudden hard braking.

With attention still directed to FIG. 2, the ball bearing housing 50 is of rectangular configuration and is substantially coextensive with top plate 60. Housing 50 includes an upper planar surface 52. A plurality of ball bearings 54 are contained within upper surface 52 and are free to rotate therein. A socket 58 is disposed in the surface 52 adjacent each corner of housing 50. Housing 50 is mounted to the floor 59 of a vehicle (see FIGS. 1 and 2).

The four shock absorbers 70a, 70b, 70c, 70d are each provided with a damper 71 and a biasing means 72. Each damper 71 (as best shown in FIGS. 1 and 3) has an upper end 73, a lower end 74. The upper end 73 of each damper 71 is formed as a ball-like structure which is adapted to and engage with a corresponding socket 26 formed in the bottom surface 22 of the seat cushion 20. The lower end 74 of each damper 71 forms a socket to receive and engage with a corresponding member 80 for linking the shock absorbers 70a, 70b, 70c, 70d to the ball bearing housing 50.

In its preferred form each of the members 80 for linking the shock absorbers 70a, 70b, 70c, 70d to the ball bearing housing 50 consists of a rod 86. Each rod 86 has an upper end 82 and a lower end 84. Each end 82, 84 is formed as a ball-like structure. The upper end 82 of each rod 86 is dimensioned and configured to be received and movably secured in the lower end 74 of a corresponding damper 71, while the lower end 84 of each rod 86 is dimensioned and configured to be received and movably secured in a corresponding socket 58 of the housing 50. The securement of the ends 82, 84 of the rods 86 with the corresponding dampers 71 and corresponding sockets 58 of the housing 50 form ball and socket joints. Each member 80 has a length such that it is disposed in a vertical position when the seat apparatus 10 is in a normal position (FIG. 1).

It is preferred that the biasing means 72 is a coil spring or air spring (not shown) wherein the spring 72 has an upper end 76 and a lower end 77. Each end 76, 77 of the spring 72 is fixedly attached to a corresponding end 73, 74 of a corresponding damper 71. Each spring 72 is dimensioned and configured to wrap around the body portion of a corresponding damper 71, and has an equilibrium position (as shown in FIG. 1) when the seat apparatus 10 is in a normal position. When the seat apparatus 10 is in the normal position, each of the top plate 60 and ball bearing housing 50 is in an original position relative to one another along a longitudinal axis of the vehicle. As is common in the art, the equilibrium position of each spring 72 may be set to different tensions, such as a relaxed, slightly compressed, or compressed. The setting will depend on the type of ride desired. As shown in FIG. 1, equilibrium position of each spring 72 is set at a slightly compressed tension.

A pulley system generally indicated at 90 is employed for restoring the seat apparatus to its normal position when there is movement due to a collision or a hard braking. As best shown in FIG. 2, the pulley system 90 includes two floor pulleys 91, two seat pulleys 92, and two elastic pulley cables 93 (only one shown). The floor pulleys 91 are fixedly attached to the vehicle floor 59 in the positions shown. Channels are provided in housing 50 at 50a and in plate 60 at 60a so that plate 60 may move freely on housing 50. The seat pulleys 92 are attached to the frame 36 of the seat back cushion 30 in the positions shown in FIGS. 1–3. Pulleys 91, 92 are attached by any convenient and effective means known in the art. A cylindrical bar may be utilized instead of the seat pulleys 92 if desired. Each pulley 91, 92 has a groove 94 (as shown in FIG. 2) for receiving a corresponding cable 93. Each cable 93 has a first end 95 and a second end 96. The first end 95 of each cable 93 is securely attached to corresponding attachment points along a circle 97 (as best shown in FIG. 2) on the bottom surface of seat cushion 20. As contemplated the first end 95 of cable each cable can be attached at six points along circle 97. Each cable 93 is threaded through a corresponding channel 44, corresponding pulley 91, and corresponding pulley 92. The second end 96 of each cable 93 is securely attached to a corresponding attachment point 98a, 98d (as best shown in FIG. 2) on the frame 36 of the seat back cushion 30. The cable ends may be attached by any convenient and efficient means known in the art. The second end 96 of each cable 93 is an elastic spring so that the second end 96 of each cable 93 is able to return substantially to an original position after the accident or sudden hard braking.

The vehicle seat apparatus 10 may further include two seat restraints 100a, 100b and two lateral side air bags 110a, 110b. The restraints are utilized to hold the upper torso of a user against the cushion 30. Each seat restraint 100a, 100b has an upper end 102 and a lower end 104. Upper ends 102 are securely attached to the frame 36 in the positions shown in FIGS. 1–3. Lower ends 104 may be detachable so as to permit a user fasten and unfasten the restraints as necessary. The restraints are flexible so as to provide sufficient comfort for the user.

Lateral side airbags 110a, 110b are positioned on respective restraints 100a, 100b as best shown in FIG. 3. Each airbag is provided with respective means (not shown) for supplying inflation gas thereto. A conventional sensor (not shown) actuates inflation gas supply means (not shown)

when the vehicle is involved in an accident of a of a degree to activate the sensor. As shown in FIG. 3, air bag 110a, when inflated, emerges proximate the first lateral side 12 of cushion 30. Although not shown inflated, air bag 110b functions in like manner as airbag 110a. It is preferred that the sensor system (not shown) permit the side air bags to be inflated when the conventional air bags (not shown) located in the dash and/or steering column are inflated.

When a vehicle experiences a frontal impact in an accident, or in a sudden hard braking of the vehicle, the seat apparatus of the present invention responds in the following manner to relieve different types of forces, shocks, and vibrations created by the accident. The two front shock absorbers 70a, 70b compress further downward, the two rear shock absorbers 70c, 70d extend upward, the linkage rods 80 move forward, the top plate 60 slides forward, the cables 93 are pulled upward as the seat cushion 20 and seat back cushion 30 move downward, and the side air bags 110a, 110b are activated for inflation.

When a vehicle experiences a left side impact (not shown) in a vehicle accident, the seat apparatus 10 that is within the vehicle responds, preferably, in the following manner to relieve different types of forces, shocks, and vibrations created by the accident. The left front 70a and left rear 70c shock absorbers compress further downward, the right front 70b and right rear 70d shock absorbers extend upward, the top plate 60 slides toward the second lateral side 14, the seat cushion 20 and seat back cushion 30 move toward the second lateral side 14, and the side air bags 110a, 110b are activated for inflation.

When a vehicle experiences a right side impact (not shown) in a vehicle accident, the seat apparatus 10 that is within the vehicle responds, preferably, in the following manner to relieve different types of forces, shocks, and vibrations created by the accident. The right front 70b and right rear 70d shock absorbers compress further downward, the left front 70a and left rear 70c shock absorbers extend upward, the top plate 60 slides toward the first lateral side 12, the seat cushion 20 and seat back cushion 30 move toward the first lateral side 12, and the side air bags 110a, 110b are activated for inflation.

Figure 4:
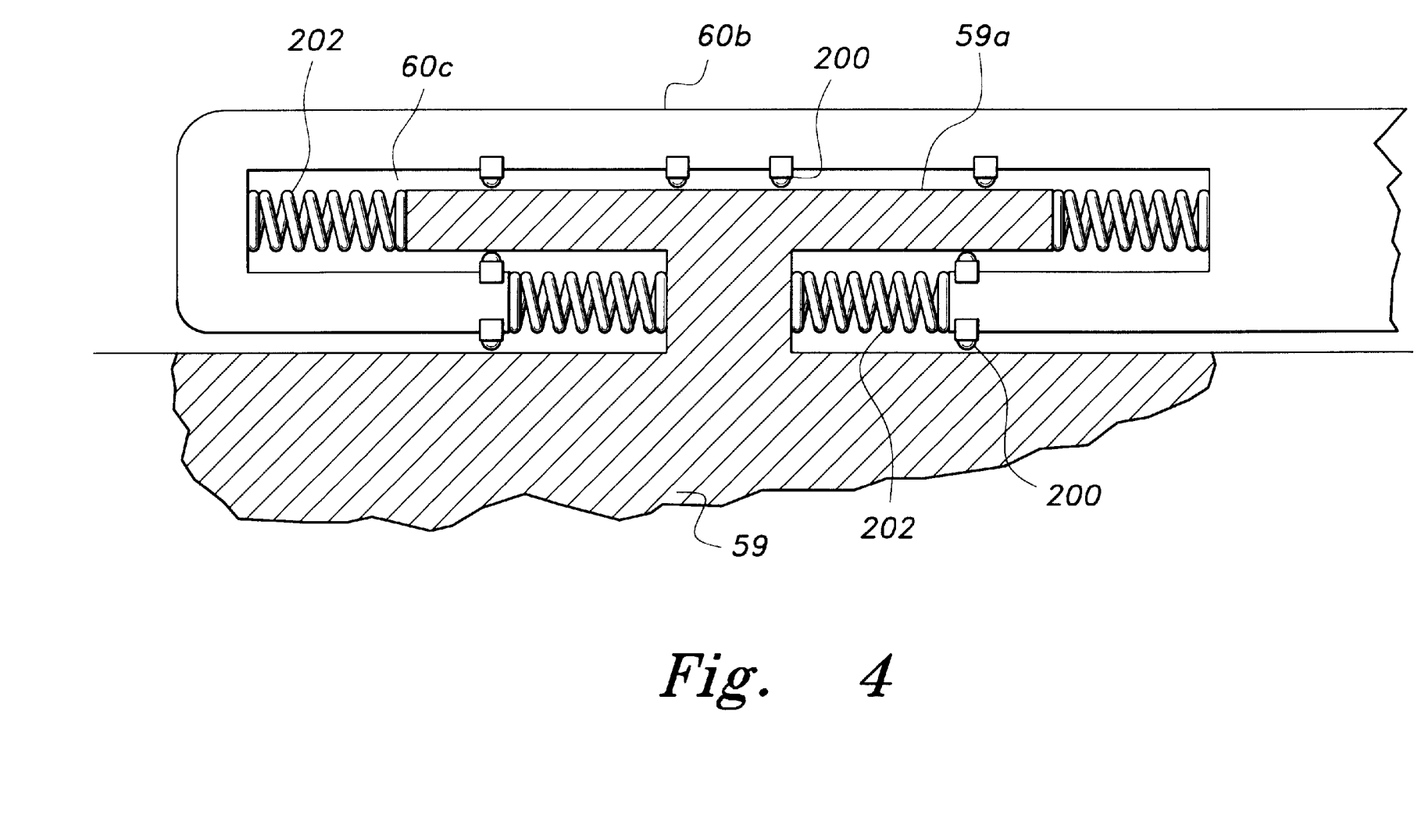
FIG. 4 is a partial sectional view of a base plate and vehicle floor according to a second embodiment of the present invention.
Figure 5:
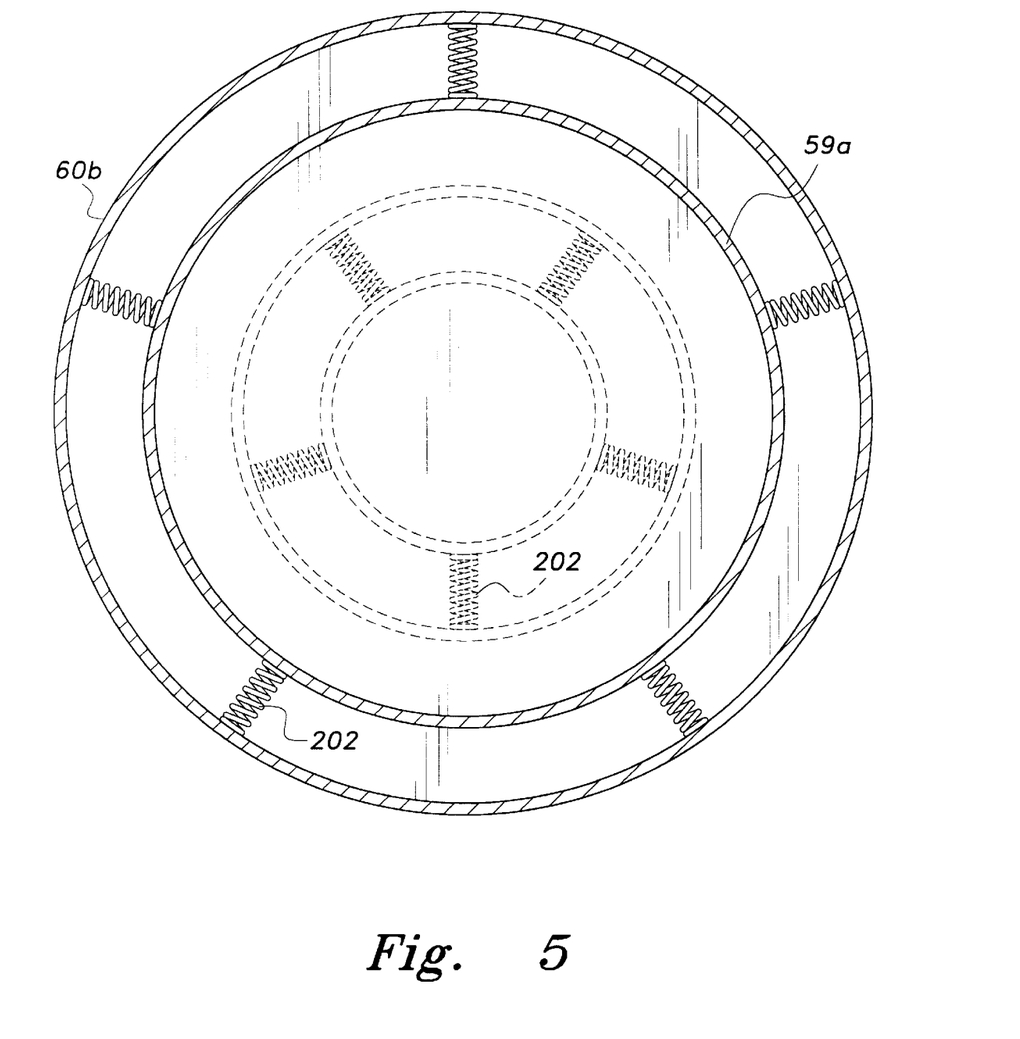
FIG. 5 is a top cut-away view of a base plate and vehicle floor according to a second embodiment of the present invention.
Figure 6:
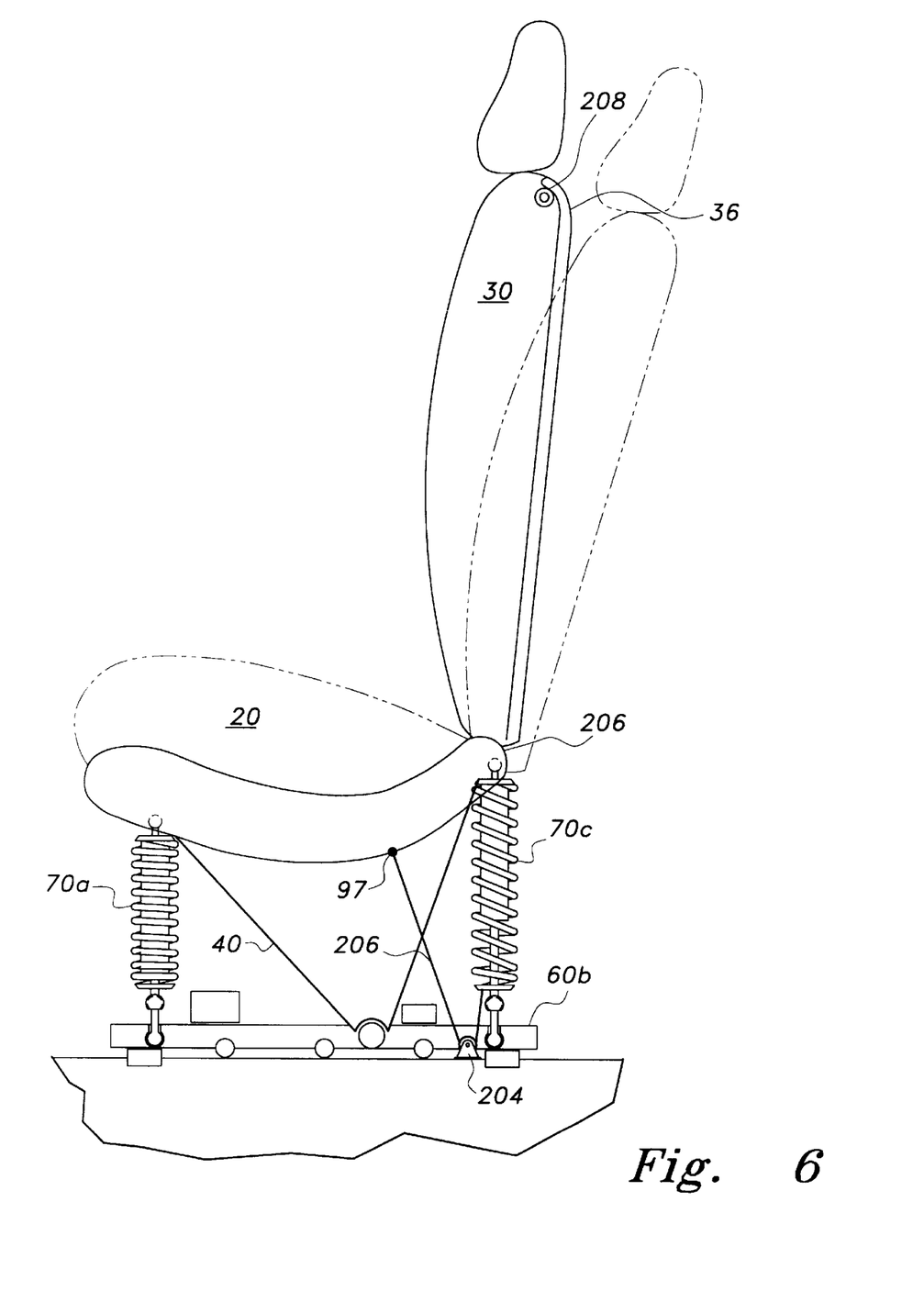
FIG. 6 is a side view of an impact absorbing seat according to a second embodiment of the present invention.

A second embodiment of the invention is illustrated in FIGS. 4–6. Attention is first directed to FIGS. 4 and 5 which show base plate 60b disposed adjacent the floor 59 of the vehicle. As best seen in FIG. 4, base plate 60b has a cavity 60c formed therein adapted to receive a raised disc-shaped formation 59a formed from floor 59. Ball bearing devices 200 are attached to the base plate 60b in any convenient manner so that the base plate may move freely on floor 59 and disc-shaped section 59a to cushion the forces of collision when there is impact or hard braking. A plurality of coiled springs or air springs 202 are positioned in an upper and lower array to limit the slide of the base plate and to return the base plate to its original position after an impact or hard braking. As best seen in FIG. 5, there are at least five coiled or air springs 202 in each array. Base plate cavity 60b is formed as a circle (or oval, if desired) so that movement of base plate 60a is omni-directional.

Attention is directed to FIG. 6. The safety system of the second embodiment comprises two pulleys 204 (only one shown) fixedly attached to the vehicle floor. Each pulley is provided with a pulley cable 206 (only one shown). One end of each cable 206 is attached to a roller 208 incorporated to the upper end of back cushion frame 36. The other end of each cable 206 is provided with at least six attachment evenly spaced points along circle 97 at the bottom of seat cushion 22. The front and rear shock absorbers 70a, 70c are connected to plate 60b and seat cushion bottom 22 in the same manner as in the previous embodiment. As illustrated (FIG. 6), the phantom lines are indicative of the seat back and cushion at a normal position. The solid lines show the position of the back and cushion during impact wherein the pulley system is effective to allow an occupant of the vehicle to use his/her gravitational momentum against the forces generated by such impact or by a hard braking. Any movement of the back cushion frame 36 will cause cables 206 to pull seat cushion down into the support structure 40 holding the occupant at a safer position during impact or hard braking. As contemplated, the pulley cables should adjust to the weight of the occupants before it could be activated automatically by crash sensors or similar devices, if desired.

Figure 7:
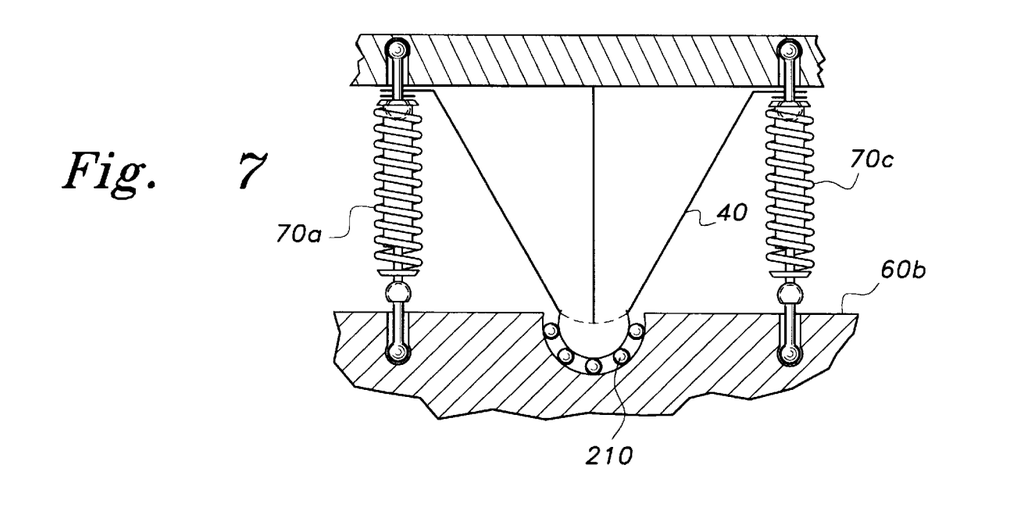
FIG. 7 is a side view of a support structure for an impact absorbing seat according to a second embodiment of the present invention.
Figure 8:
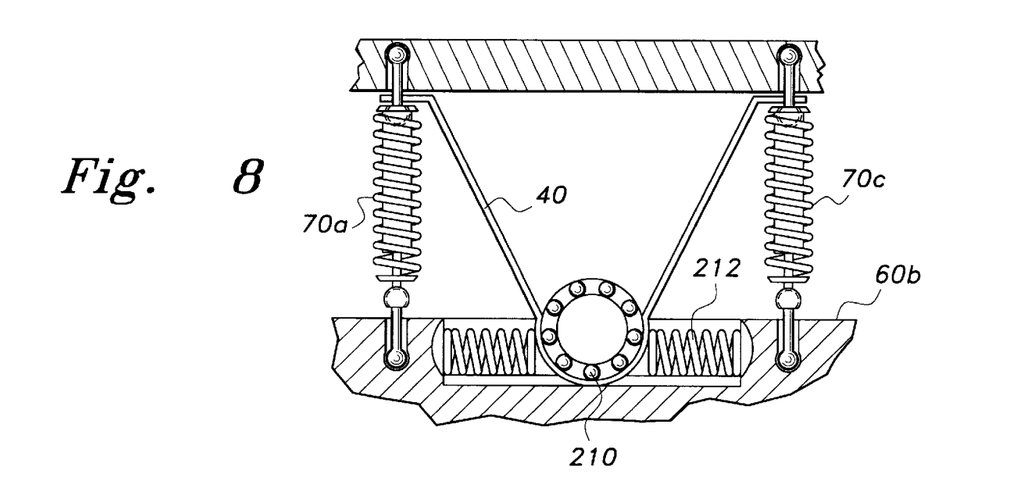
FIG. 8 is a side view of a third embodiment of a support structure for an impact absorbing seat according to the present invention.

FIGS. 7 and 8 show alternative structural techniques whereby support structure 40 may be engaged with base plate 60b. In FIG. 7, plural ball bearings 210 have been inserted in the socket to make for smoother universal movement of support structure 40. FIG. 8 incorporates coiled springs 212 to limit slide, cushion the forces of collision and to return the support structure to its original position after impact or hard braking.

It is to be understood that the present invention is not limited to the sole embodiments described above, but encompasses any and all embodiments within the scope of the following claims.

I claim:

1. A vehicle seat apparatus for absorbing different types of forces, shocks, and vibrations encountered in accidents and sudden hard braking of a vehicle, said vehicle seat apparatus comprising:

a seat cushion having an internal frame, a top surface and a bottom surface, said seat cushion adapted for supporting an occupant when seated thereon;

a seat back cushion having an internal frame, a front surface and a rear surface, said seat back cushion adapted for supporting the back of the occupant when seated on said seat cushion;

a bottom support structure, said bottom support structure having a plurality of connected sides which slope to form a hollow pyramid having an apex and a base, said base attached to said bottom surface of said seat cushion;

a bulbous member, said bulbous member attached to said bottom support structure at said apex;

a base plate adapted to be movably positioned on a vehicle floor, said base plate engaging with said bulbous member and being movable from an original position;

second means for restoring said base plate to said original position.

2. The seat apparatus according to claim 1, wherein said base plate includes an upper surface and a lower surface;

walls defining a cavity, said cavity centrally located in said upper surface of said base plate, said bulbous member positioned in said cavity, said cavity and said bulbous member dimensioned to permit said bulbous member to have universal movement relative to said cavity.

3. The seat apparatus according to claim 2, wherein ball bearings are disposed in said cavity, said ball bearings interposing the cavity walls and said bulbous member.

4. The seat apparatus according to claim 3, wherein plural springs are disposed in said cavity, said springs interposing the cavity walls and said bulbous member.

5. The seat apparatus according to claim 2, wherein said second means includes a plurality of pulleys, said plurality of pulleys adapted to be fixedly attached to the vehicle floor;

a cable received in each of said plurality of pulleys, each cable having a first end and a second end;

the first end of each cable connected to said bottom surface of said seat cushion;

the second end of each cable connected to the internal frame of said seat back cushion.

6. The seat apparatus according to claim 5, wherein said first end of each cable is connected at plural positions to said bottom surface of said seat cushion.

7. The seat apparatus according to claim 6, wherein said first end of each cable is connected to said bottom surface of said seat cushion at at least six positions.

8. The seat apparatus of claim 6, wherein plural corners are defined on said seat cushion internal frame;

a plurality of shock absorbers;

each of said plurality of shock absorbers having a first end and a second end, each said first end connected to said internal frame at a respective one of said plural corners.

9. The seat apparatus according to claim 8, wherein said first means includes a ball bearing housing, said ball bearing housing comprising a frame and a plurality of ball bearings contained within said frame, said ball bearing housing adapted to be mounted to the vehicle floor;

said lower surface of said base plate positioned on said plurality of ball bearings whereby said base plate slides over said plurality of ball bearings in lateral, forward and rearward directions.

10. The seat apparatus according to claim 9, wherein plural corners are defined on said base plate and said ball bearing housing;

a channel formed through each of said plural corners on said base plate;

each said second end of said plurality of shock absorbers connected to said ball bearing housing at a respective one of said corners on said ball bearing housing.

11. The seat apparatus according to claim 10, wherein each said first end and each said second end of said plurality of shock absorbers are connected with ball and socket connectors.

12. The seat apparatus according to claim 11, further including at least one lateral side restraint, said restraint having upper and lower ends attached to said seat back cushion internal frame; and a lateral side air bag positioned on said lateral side restraint.

* * * * *